United States Patent [19]

Niskanen

[11] 4,429,709
[45] Feb. 7, 1984

[54] CASCADE-BASED METHOD AND DEVICE FOR FLUID HANDLING AND MEASUREMENT

[76] Inventor: Erkki J. Niskanen, Länsituulentie 8A16, 02100 Espoo 10, Finland

[21] Appl. No.: 316,819

[22] Filed: Oct. 30, 1981

[51] Int. Cl.³ .............................................. F16K 24/00
[52] U.S. Cl. ................................... 137/220; 137/221; 137/489
[58] Field of Search ............... 137/220, 221, 222, 486, 137/489; 236/49, 80 R, 80 G

[56] References Cited

U.S. PATENT DOCUMENTS

| Re. 18,849 | 5/1933 | McClellan et al. | 137/222 X |
|---|---|---|---|
| 1,629,957 | 5/1927 | Larner | 137/221 |
| 1,723,359 | 8/1929 | Larner | 137/222 |
| 1,998,459 | 4/1935 | Kinzie | 137/222 |
| 2,052,572 | 9/1936 | Kerr | 137/222 |
| 3,275,022 | 9/1966 | Kobayashi et al. | 137/221 |
| 3,515,165 | 6/1970 | Zadoo | 137/221 X |
| 3,972,448 | 8/1976 | Brown | 137/220 X |

Primary Examiner—William E. Tapoicai

Attorney, Agent, or Firm—McGlew and Tuttle

[57] ABSTRACT

A method and devices for applying the generally known principle of cascade flow in control of self-adjusting fluid handling systems, which devices are capable of maintaining predetermined flow rate/pressure difference ratios, over a wide range of variations.

The capability of maintaining predetermined flow rate/pressure difference ratios is based on a capability of maintaining predetermined displacement/pressure difference ratios of axially displaceable means of control in application of the principle of cascade flow.

One embodiment is a draught control device, which is capable of maintaining substantially constant draught, e.g., in central heating boilers of solid fuel, over a wide range of variations in flue pressure.

Another embodiment is a constant flow valve, capable of maintaining constant rate of volume flows in house ventilation.

A third embodiment of the present invention is a constant pressure valve, capable of maintaining constant pressure of fluid upstream the valve.

12 Claims, 22 Drawing Figures

CASCADE-BASED METHOD AND DEVICE FOR FLUID HANDLING AND MEASUREMENT

FIELD AND BACKGROUND OF THE INVENTION

The present invention relates generally to a method and devices for applying the generally known principle of cascade flow in self-adjusting fluid handling systems, these devices being capable of maintaining pre-determined flow rate/pressure difference ratios over a wide range of variations. Thus, the applications, employed, e.g. in constant flow and contant pressure valves as described below, are two special cases only.

The invention further relates to fluid handling devices as mentioned above, which also are responsive to outside physical effects like temperature, pressure or electromagnetic force.

Furthermore, the invention relates to converting apparatus for measurement i.e. of flow rate, pressure and accumulated amount of thermal energy of fluid flow.

While the principal features of the invention are not limited in application to any particular fluid or fluid handling system, its desirable features and its attendant advantages are most apparent when applied in conjunctions with the control of draught in central heating boilers using solid fuel, in house ventilation system and for purposes of measurement.

Draught regulating systems for the control of combustion air in central heating boilers, which are small or medium in size, generally employ a bi-metal spiral spring or thermostat, which by means of a chain, closes the fire-door in case that the temperature of water in the system has reached the maximum allowed.

The system has the following defects:
It affects the primary air only, and there is no continuous control of secondary air.
The action of the system has certain delay causing fluctuations in the process of combustion.
The system is not responsive to variations in pressure difference in the flue, these variations being caused by variations in wind direction and pressure and by the temperature of the flue gases.

The system described above is, in fact, a system of safety against boiling, not a system for maintaining constant draught as would be important in the boilers, particularly in care of installations having means for continuous feed of solid fuel.

The defects mentioned above can be avoided by means of an automatic butterfly valve in the flue, which is responsive to variations in the pressure of the flue gases and to the temperature of heating water. The outdoor temperature can also be considered in the regulation operation.

For this purpose, however, a complicated system with electronic and electromechanical components is necessary to control the movements of the flap and to overcome the resistance of the bearings and the stuffing boxes.

It is, therefore, desirable to provide an adjustable draught control device, which maintains selected constant draught between certain maximum and minimum values of the flue pressure, which is responsive to the temperature of water and which can be fitted with means for consideration of the indoor or outdoor temperatures in the regulation operation.

According to the present invention, there is provided a device, which is capable of maintaining a substantially constant draught in central heating boilers using solid fuel. This device is responsive even to small variations in flue pressure which are caused by variations in temperature of the flue gases, thermal height of the flue and variations in direction and pressure of winds. The temperatures of heating water and indoor or outdoor air can also be considered in the regulation operation.

A system of exhaust ventilation, based on common ventilator and main duct and fixed exhaust valves in each space, has become more and more general in blocks of flats because of its low cost in construction and maintenance.

A basic feature for the system is that the ventilator and the ducts are dimensioned to transfer constant volumes of air per hour from each space according to norms.

The exhaust valves are adjusted to a fixed position which can not be altered. In so doing, the volume flows of other valves and rates of ventilation in other spaces are affected. In addition, at lower pressures and rates of volume flow, the whole system or a part of it may get out of balance.

Therefore, the total rate of air exchange of an apartment depends on the needs of individual spaces like kitchen, WC and bathroom, and a total rate of air exchange of 1/hour or more in an apartment is quite common, whereas a rate of 0.5/h would be quite sufficient. This represents a large waste of energy in heating and the maintenance of humidity, not forgetting draughtiness and danger to health.

Opening the doors and windows affects the balance of the system causing also a mix of the ventilation air between the compartments.

The system is also exposed to disturbances caused by variations in natural draught and direction and pressure of winds. This in particular, when the revolutions of the ventilator, and the total volume flow respectively, drop down to 50% of normal for reasons of energy saving at lower outdoor temperatures. In this case, the pressure difference drops down to 25% of normal, which is less than the minimum for maintenance of the system balance.

It is, therefore, desirable to provide an adjustable, automatic exhaust valve, which maintains selected constant flow of air between pre-determined maximum and minimum values of the duct pressure. Moreover, the valve should be suitable for wall-mounting and be operational also at very low pressure differences, assumming there is no filtration of the main flow.

Automatic constant flow valves, capable of maintaining a constant volume flow rate, belong to the class of fluid flow regulators and have been disclosed in the prior art.

Devices are known, which employ linear or spiral springs and aerodynamic force of the liquid flow. These devices have the following disadvantages:
A rather high pressure difference, 10 mm w.g. at least, is needed for accurate operation.
Separate means of damping are necessary against pulsation effects of the duct system.
Moving parts like the bearings and the damping mechanisms of the device are subject to impurities like dust and grease of the fluid. This has largely lowered functionality and accuracy of the devices.

It is difficult to bring into effect adjustability of the device, particularly if automatic timing of the function is required.

Furthermore, other devices are known, in which the constant rate of flow is maintained by an elastic bag in the opening of the main flow. The enclosure of the bag is connected, through a boring in its base, to the side of higher pressure, thus throttling the opening according to the variations in pressure difference.

Disadvantages of such devices are:

The device can not be made fireproof.

It cannot be made adjustable.

The impurities of the fluid like dust or grease in the air easily damage the functionality of the device.

Constant flow values are also widely used, the function of which is based on use of outsider energy like electricity, pneumatics or hydraulics. Due to its complicated system, this type of valve is energy consuming and too expensive for control of ventilation in individual spaces of apartment buildings.

A reference can be made to U.S. Pat. No. 4,121,762, showing an automatic fluid flow regulator. The regulator described belongs to the group of devices employing (a group of) linear springs and aerodynamic force of the fluid flow.

In addition, a pneumatic, thermometric mechanism may also be employed to adjust the flow in response to changes in temperature and independent of pressure variations.

The system described shares the disadvantages of this group of devices as given above, excluding, however, damping of pulsations. Furthermore, it is not suitable for wall-mounting in habitable spaces and it presumes both very high pressure difference and full filtration of the main flow for proposed function.

SUMMARY OF THE INVENTION

According to the present invention, there is provided an automatic constant flow valve, which is capable of maintaining a substantially constant flow rate of exhaust air in house ventilation. The inventive valve, which is adjustable and responsive to pressure variations between pre-determined minimum and maximum values of pressure, has the following effects and characteristics;

It is operational at very small difference of pressures.

Its response to pressure variations is very rapid and accurate.

It stabilizes the balance of said ventilation systems in case of occurence of said disturbances and rectifies erroneous design and leakages of the duct system.

The apartment can be window-ventilated without any influence on ventilation and quality of air of other apartments.

It enables adjustment of ventilation by individual spaces, which is essential for billing the heat consumption by apartments.

The valve can replace separate fire shut-off valves between the fire compartments, if fitted with a thermofuse for fire shut-off release.

The pneumatics applied forms a built-in system of damping against the pulsation effects of the duct system.

No outside sources of power are needed for the operation.

Because of its construction and way of function it is easy to fit the valve with remote-and-time control for purposes of energy saving.

The method applied in the invention can be based either on vacuum or excess pressure of the fluid and serves, therefore, in systems both of supply and exhaust (suction).

Only a fraction, about 1 percent, of the fluid flow is used for purposes of control and requires filtration. Therefore, all mechanical components of control and the moving parts as well work in a space of filtered air, which arrangement is essential both under habitable and industrial conditions.

Another application of the present invention in house ventilation is an automatic constant pressure valve, which is capable of maintaining constant pressure in a space.

Pressure regulators, using external energy for control functions, have previously been used for this purpose. Having complicated means like sensors and electromechanical appliances for the function. These are, however, too expensive for smaller installations.

Contrary to the relief or safety valves, also previously used for this purpose, the device of the present invention is capable of maintaining, at each moment and pressure, a rate of flow, which tends to retain the object pressure in said space, thus following the curve of volume flow of constant pressure.

Finally, a device of the present invention, having in principle, the construction of a constant flow valve and being accurately calibrated to maintain desired rate of volume flow at varying pressures, can be fitted, with electronic means for display of the rate of volume flow, temperature, pressure and accumulated amount of thermal energy transmitted by the device. Thus, the device of the present invention may be advantageously employed as a converter for purposes of measurement or control of other devices.

BRIEF DESCRIPTION OF THE DRAWINGS

The invention will be better understood by reference to the accompanying drawings in which.

DESCRIPTION OF THE PREFERRED EMBODIMENTS

Figure 1:
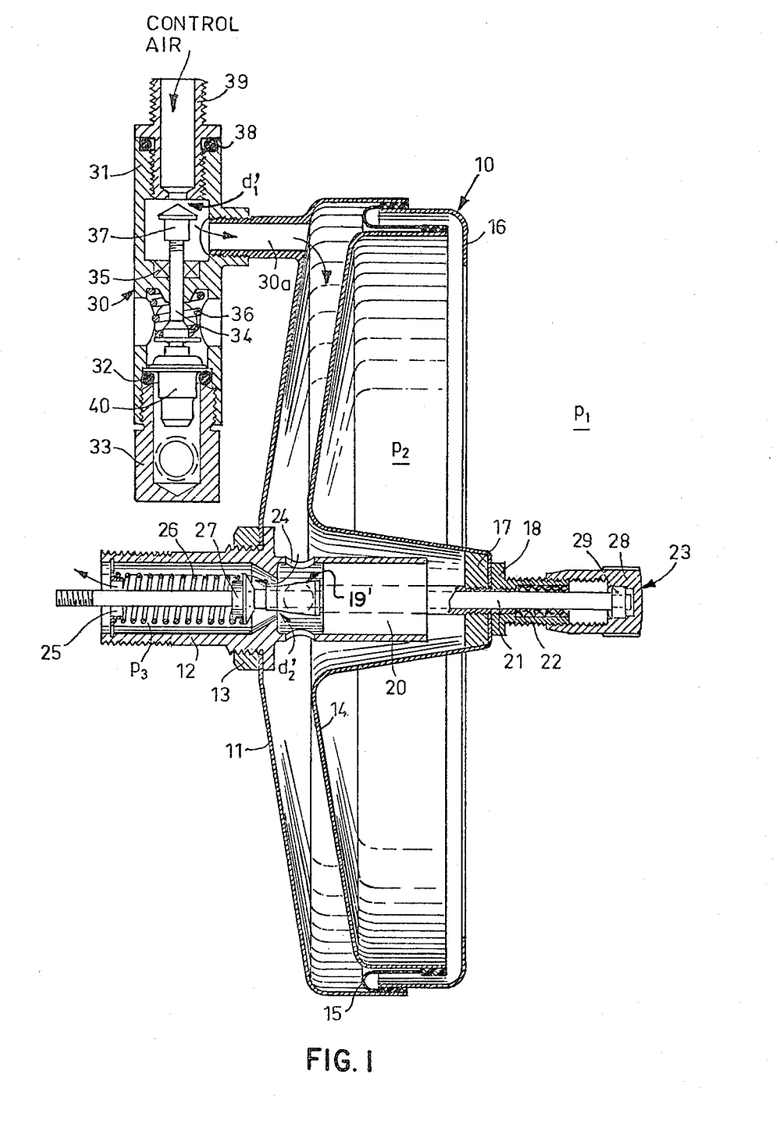
FIG. 1 is a cross-sectional view of one embodiment of the draught control device.
Figure 4:
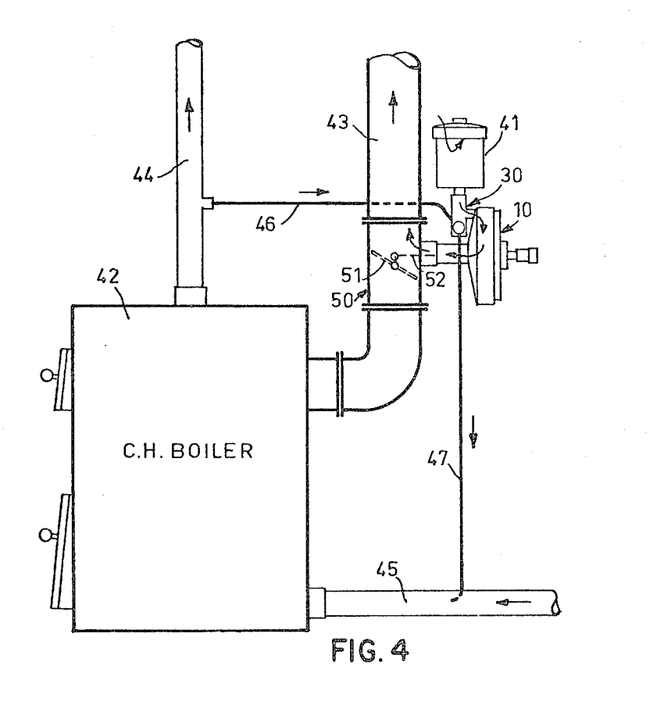
FIG. 4 is a schematic representation illustrating, how the device of the present invention is applied in control of draught in central heating boilers.

The draught control device, illustrated by FIGS. 1 and 4, comprises an assembly of a vacuum actuator 10 and means of control and adjustment 23, a thermostat valve 30, a filter 41 and a flue gas valve, comprising a valve housing 50, a butterfly valve 51 and connecting means 52. FIG. 4 also illustrates installation of the draught control device in a central heating system.

The valve housing 50 is located in the flue 43 of a central heating boiler 42. The boiler is of natural draught type using solid fuel. The thermostat valve 30 is connected, with a supply pipe 46, to heating water main pipe 44 and, with an exhaust pipe 47, to the return water main pipe of the boiler respectively.

Figure 2:
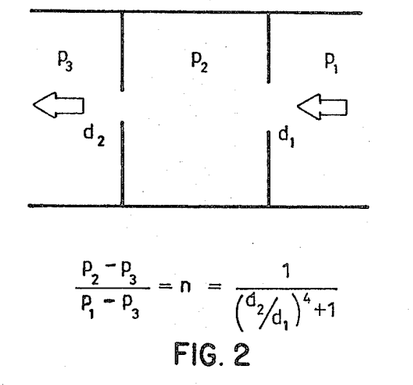
FIG. 2 is a schematic representation illustrating the principle of cascade flow applied.

The function of the draught control device is based on the pressure ratio formula of cascade flow shown in FIG. 2 (see e.g. Kurt W. Geisler: "Regelung von Heiz- und Klima-Anlagen" 2. ed., Marhold-Verlag, Berlin 1969, s. 65) which is self-explanatory.

At reasonable difference of pressures, if n refers to the ratio of pressure differences, then $$n = (p_2 - p_3)/(p_1 - p_3), \text{ is} \tag{1}$$

$$n = \frac{1}{(d_2/d_1)^4 + 1}, \tag{2}$$

where $p_1$, $p_2$ and $p_3$ are pressures, $p_1 > p_3$, and $d_1$ and $d_2$ are diameters of the openings.

Therefore, if $d_2 = d_1$, $n = 0.50$ and the pressure difference $p_2 - p_3 = 50\%$ of the total pressure difference.

Figure 3:
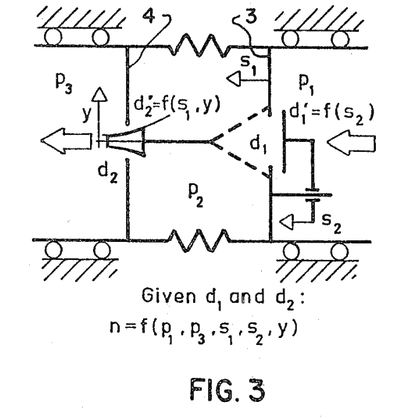
FIG. 3 is a schematic representation illustrating how the equation of pressure ratios is employed in the applications of the present invention.

FIG. 3 illustrates, how the equation for n is employed in the invention.

The enclosure between the walls is made flexible and the wall 3 presented against the inlet pressure $p_1$, or the wall 4 presented against the outlet pressure $p_3$, or both of them are capable of moving axially so that the distance between the walls can be changed by distance $s_1$. The opening $d_2$ is replaced by means of a control cone, with a ring-formed equivalent opening $d_2'$ so that $d_2' = f(s_1, y)$, where y is a radius of the cone. The control cone is fixably connected to the wall 3 against the inlet pressure $p_1$. The opening $d_1$, in turn, is also fitted with means of adjustment so that it can be replaced with an equivalent ring-formed opening $d_1' = f(s_2)$, where $s_2$ is the absolute distance moved by the disk upstream of the opening. If required, the disk can be replaced by another control cone to form another equivalent opening $d_1'' = f(s_2, z)$, where z is a radius of this cone.

The opening $d_1$ and its equivalent may be located, by means of a conduit, outside the control device itself; however, the diameter of said conduit is to be a multiple of the diameter $d_1$ or its equivalents in order to retain the validity of the equation (2) and avoid a system of 2-stage cascade.

In FIG. 1, the actuator, designated generally as 10, comprises a cylinder bottom 11, fixably engaged with control valve housing 12 by means of nut 13 and a piston 14, hermetically sealed with said cylinder bottom 11 by means of an elastic roller membrane 15, which, in turn, is secured with a mantle ring 16 against the cylinder bottom.

The piston 14 is fixably engaged, by means of a flange 17 and a stuffing box 18, with a hollow shaft 19, extending axially in a linear roller bearing 20. The said bearing is of the type with endless roller tracks and is located in housing, which is a part of the said control valve housing 12.

The displacement and the action force of the actuator is transmitted by means of a spindle 21, engaged in alignment with said stuffing box 18 and sealed with packing 22.

The spindle 21, which is capable of axial movement, is a part of control and adjusting means, designated generally as 23.

Inside the actuator, the control valve housing 12 is fitted with radial openings 24, the total area of which is to be a multiple of the area of opening $d_1'$, thus allowing free entry from the cylinder space to the control valve space. The control valve housing 12 forms, inside the housing, a seat, which together with the cone-formed end 19' of the hollow shaft 19, forms the control valve opening $d_2'$.

The control valve housing 12 is fitted with a spider 25 to bear the force, produced by a spring 26. The spring force is transmitted by a spring guide 27, locked on the spindle 21, to the system of control and adjusting means 23. A control knob 28, fitted with threads for axial displacement is provided for axial displacement of the spindle 21 by means of a roller bearing 29.

A thermostat valve, designated generally as 30, is provided for response to the temperature signal of the heating water. The area of the cross section of the joining conduit 30a is to be a multiple of the area $d_1'$.

A nozzle 39, fitted with threads for the filter 41, is disposed within the valve housing 31 and sealed with an O-ring 38. The lower end of the valve housing forms a thermostat housing, fitted with a thermostat 40, a seal 32, and a connection plug 33 with inlet and outlet openings for the supply and exhaust pipes 46 and 47 respectively.

A thermostat spindle 34, capable of displacement in alignment with the thermostat 40, bears the force of the return spring 36. An axially adjustable control plug 37, together with said nozzle 39, forms a control valve opening $d_1'$.

The axial displacement of the spindle 21 of the control and adjusting means 23 is transmitted, by means of a connecting rod 52 and two pinpoint bearings to the butterfly valve, which also is mounted on two pinpoint bearings for minimum friction.

The operation of this embodiment is based on the control of the vacuum employing the principle of cascade flow as described.

The control air, cleaned by filter 41, enters, through opening $d_1'$ to the thermostat valve 30 and flows, via conduit 30a and the said actuator 10, to the control valve housing 12 through the openings 24. From here, passing the opening $d_2'$, the air enters the flue and mixes with flue gases. With the equivalent diameters of $d_1'$ and $d_2'$ set at a few millimeters only, the rate of volume flow is small but capable of keeping the system cool. On the other hand, it is sufficient for rapid response of the system to the variations of the flue pressure and allows an open connection to the flue and use of direct control of the butterfly valve without friction of stuffing boxes and bearings.

Given the position of the spindle 21 to provide a certain angle of opening of the butterfly valve 51, the sum force, produced by the spring 26 and the system of said butterfly valve 51 is in balance with the action force of the actuator 10 and the equality of the equation (2) is valid. Drop of the flue gas pressure results in displacement of the piston 14, together with means of control and adjustment 23, left, until the area of the opening $d_2'$ has decreased enough to return the equality in said equation (2) and the balance of the entire system respectively. Having the cone of the hollow shaft 19' properly dimensioned, the butterfly valve 51 has reached a position, where the rate of the flue gas flow or the draught remains unchanged.

Rise in the flue gas pressure results in drop of the action force of the actuator 10 and the force, produced by the spring 26, returns the system and the cone to a new position, where the area of the opening $d_2'$ is large enough to return the equality of equation (2).

At predetermined maximum temperature of the central heating water, the thermostat 40 responds to it and lifts the thermostat spindle 34 upwards until the control plug 37 has fully closed the opening $d_1'$. Thus, $d_1=0$, $n=0$ and $p_2-p_3=0$, which means that the vacuum of the flue gas affects the piston 14 in full, causing displacement of the piston to the leftmost position and reduction of the flue gas flow respectively. Decreased draught, in turn, results in drop of the heating temperature and the return spring 36 returns the thermostat 40 to its initial position.

FIGS. 5 to 8 illustrate a theory for a definition of the control cone characteristics required.

Figures 5, 6, 7, 8:
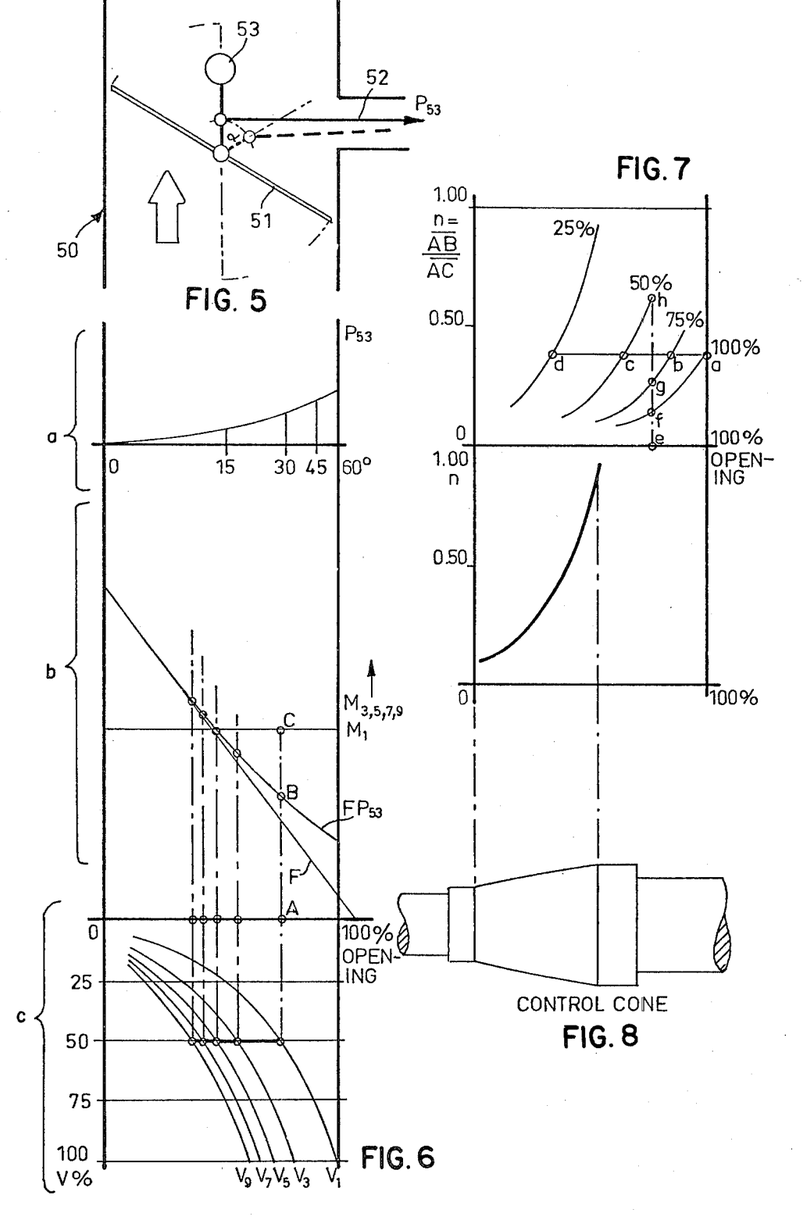
FIGS. 5 to 8 illustrate a theory for definition of the control cone characteristics of the embodiment illustrated in FIG. 1.

FIG. 5 illustrates the butterfly valve 51 in closed position. The direction of flow of the flue gases in the valve housing 50 is upwards. Opening the valve to an angle α results in a counterwise torque, caused by aerodynamic forces, which torque is balanced, to a certain extent, by means of a counterweight 53. The resultant force, produced by these torques and transmitted to the spindle 21 by the connecting rod 52, is designated as $P_{53}$ and plotted in FIG. 6 top portion a, against the angle of opening α.

In FIG. 6 top and middle portions a and b, the force $P_{53}$, together with the force F produced by the spring 26, is plotted against the percentage of opening of the valve, measured in axial displacement of the spindle 21. The sum force of forces $P_{53}$ and F is designated as $FP_{53}$. In the same system of axis there are plotted the forces M of the piston 14 at zero $d_1'$, designed as $M_1-M_9$, and corresponding to the constant pressures of 1 to 9 units per unit of area.

In FIG. 6 bottom portion c, the rates of the volume flows $V_1-V_9$, in percent, are plotted against the percentage of opening, corresponding to the constant pressures of 1 to 9 units per unit of area respectively.

Thus, in the operation and given the rate of volume flow 50% of maximum, a vertical line AC can be plotted to pass the point of intersection of the curve $V_1$ and the horizontal line of V=50%. Respective verticals can be drafted to pass other points of intersection.

Therefore, the distance AB represents the piston force, required for the balance, in comparison with the maximum piston force available at this pressure of 1 unit per unit of area. The ratio AB:AC=n.

In FIG. 7 top portion, values of n for values of 25%–100% of V are plotted against the percentage of opening. Each curve of n has its respective position of the adjustement knob 28.

It can be seen that, for a given position e of the butterfly valve 51, various rates of the flue gas flow can be obtained with different values f, g, h of n. Thus, it is possible to change the rate of flow just by changing the value of $d_1'$, however, with certain limitations in regard to the range of pressures. This is employed in the system of the thermostat valve 30.

It is more advantageous, therefore, to move horizontally along the line a-b-c-d of constant n by means of the means of control and adjustment 23. Having the spring constant of the spring 26 and the torque of the butterfly valve 51 properly dimensioned, the n-curves may be shifted together to form, accurately enough, a common curve of n, illustrated in FIG. 7 bottom portion. Given the values of $d_1'$ and the seat diameter of the control valve opening $d_2'$, the form of the control cone of the hollow shaft 19' in FIG. 8 can be easily calculated by means of the equation (2). However, certain experimental corrections are necessary due to the different coefficients of resistance of round and ring-formed openings.

Figure 9:
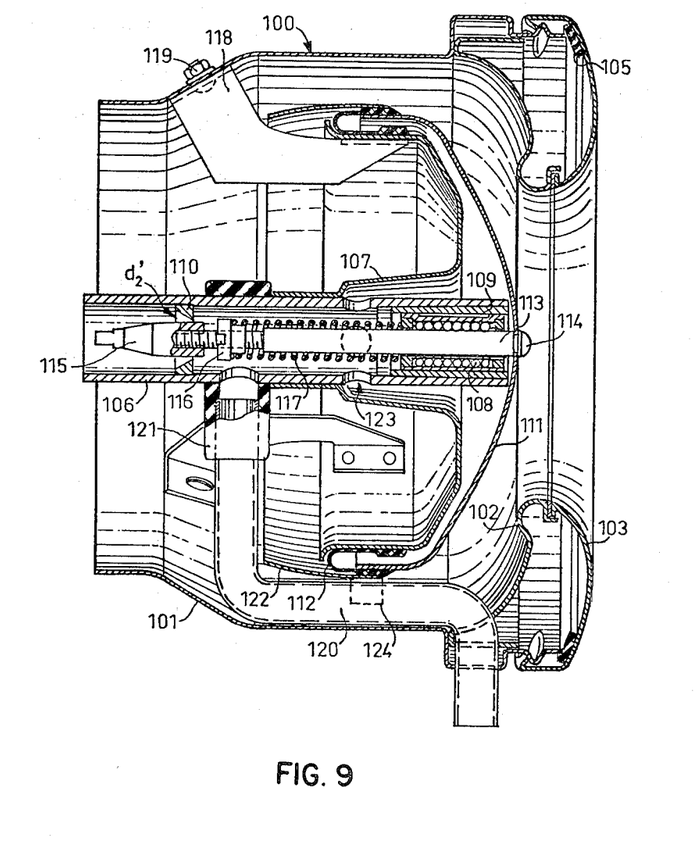
FIG. 9 is a cross-sectional view of one embodiment of the automatic constant flow valve for house ventilation.

FIG. 9 is a cross-sectional view of another embodiment of the present invention: an automatic constant flow valve for house ventilation, designated generally as 100.

A cylinder bottom 107 is fixably engaged with a valve housing 101 by means of one or preferably more supports 118 and screws 119. A linear bearing 108, with endless tracks of rollers, is disposed in the front end of a control valve housing 106. A conical bushing 109 is provided for easy adjustment of the bearing tolerance. The control valve housing 106 is, in turn, fixably engaged with the cylinder bottom 107.

Mounted in alignment with said linear bearing 108 is an axially extending shaft 113, which is capable of axial displacement.

A control and adjustment means is mounted on the shaft 113 comprising an axially adjustable control cone 115, an axially adjustable spring guide 116 and a return spring 117, disposed between the spring guide 116 and the linear bearing 108. A control valve seat ring 110 is fixably mounted inside the aft end of the control valve housing 106 to form, together with the control cone 115 a ring-formed opening $d_2'$.

The openings 123 in the control valve housing 106 are provided for an open connection between the housing and the cylinder space.

A main valve disk 111, capable of axial displacement and fixably secured with a screw 114, to the front end of the shaft 113, forms, together with an elastic roller diaphragm 112, a hermetically closed cylinder. The roller diaphragm 112 is secured with a mantle 122, fitted with a guide 124. The guide supports itself on a conduit 120 in order to protect the roller diaphragm 112 against possibility of transversal loads.

One or more openings 123 in the control valve housing, are provided.

The main valve seat 102 is sealably supported and fixed to the front end of the valve housing 101 by means of a cover 103, fitted with twist-off type threads and a seal 105. The arrangement enables easy cleaning of the valve. In a duct installation, the main valve seat may be fixably mounted without the cover 103.

A conduit 120 is disposed within the valve housing 101 to form a connection between the space of pressure $p_1$ and the control valve housing 106, to which it is joined with an elastic connector 121.

Figure 10:
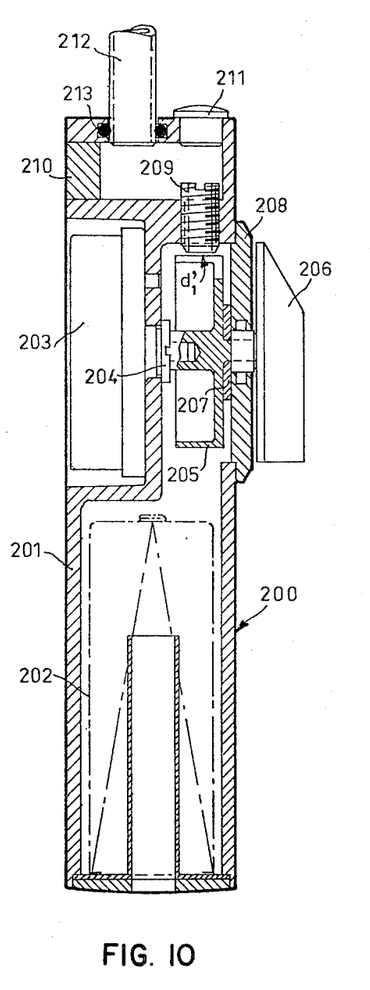
FIG. 10 is a cross-sectional view of one embodiment of an external control, timer and filtration device for the automatic constant flow valve illustrated by FIG. 9.

FIG. 10 is a cross-sectional view of an external control, timer and filtration device, generally designated 200, for remote control of the automatic constant flow valve 100.

A control air filter 202 is disposed within a remote control housing 201 for filtration of the control air. A mechanical timer 203 is fixably secured with a nut 204 to the housing. A means of adjustment, comprising a control wheel 205, a control knob 206 and a washer 207 are mounted on the extended shaft of the timer and sealed, locked and supported with a sealably secured cover 208. An axially adjustable nozzle 209 is secured to the remote control housing and defines, together with the control wheel 205, an adjustable control opening $d_1'$. A connecting pipe 212 is provided for connecting the remote control housing 201, sealably to the conduit 120. The connecting pipe is sealed hermetically with an O-ring 213 in the remote control housing, which in addition has two plugs 210 and 211 for closure of the borings.

Figure 11:
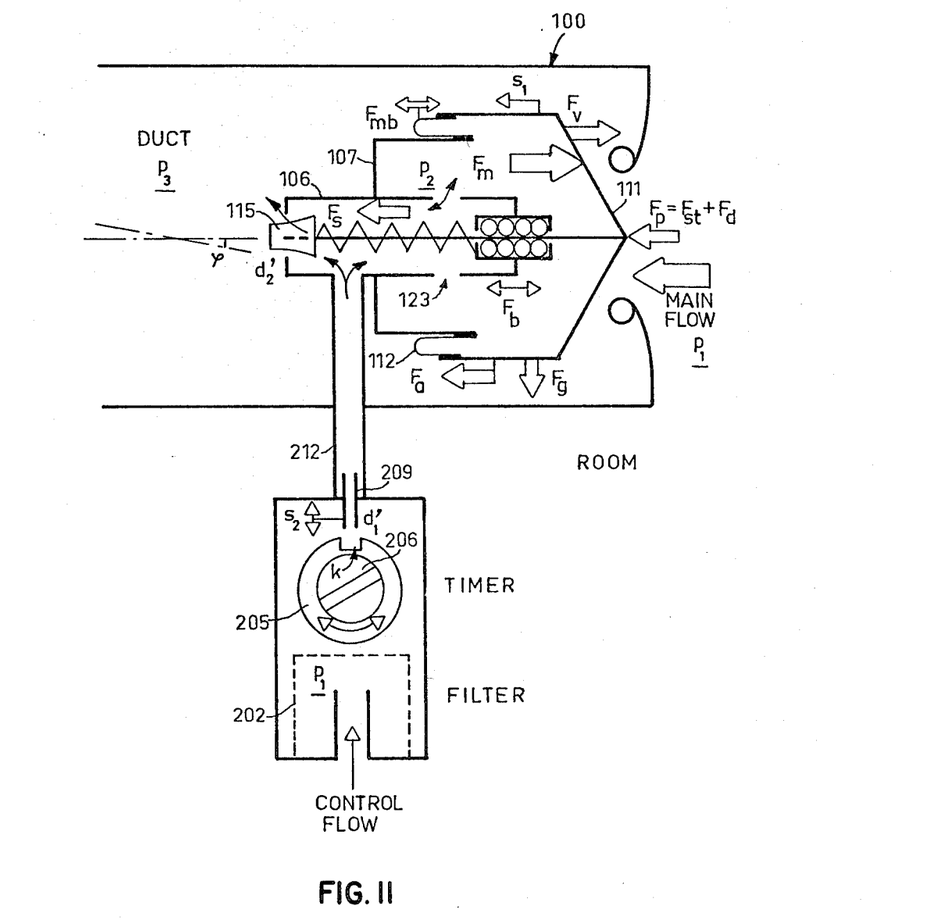
FIG. 11 is a schematic representation of the operation of the assembled automatic constant flow valve system assembled
Figure 14:
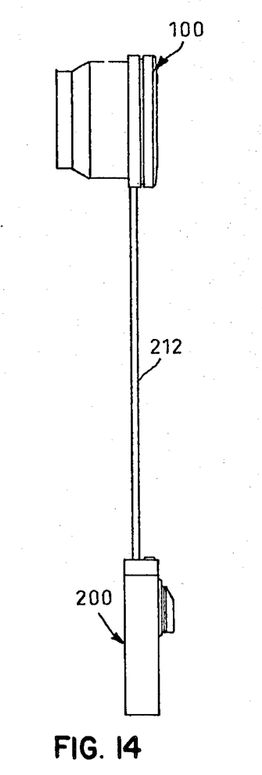
FIG. 14 illustrates assembly of the embodiments, illustrated by FIGS. 9 and 10.

FIG. 11 is a schematic representation illustrating the function of the assembly of said embodiments 100, 200 and the connection pipe 212, which assembly is also illustrated by FIG. 14.

The automatic exhaust valve 100 is sealably mounted to the inlet end of an exhaust ventilation duct. The cylinder system of the exhaust valve 100 is surrounded by the duct pressure $p_3$, which is lower than the room pressure $p_1$. The pressure $p_3$ can be lower or higher than the atmospheric pressure.

The control, timer and filtration device 200 is entirely surrounded by the pressure $p_1$, prevailing in the room to be ventilated. The rate of the control air flow needed is about 1% or less of the rate of the main flow, passing the main valve opening.

The control air enters the filter 202 and flows, passing the nozzle 209, to the cylinder space via the connecting pipe 212. The pressure $p_2$ depends, apart from the position of the control cone 115 in the control valve seat ring 110, on the position of the control wheel 205 and the displacement $s_2$, used for definition of the opening $d_1'$.

The control wheel 205, turnable by the control knob 206 and returnable by the timer 203, has a notch k in its flange opposite the nozzle 209. Having this position of the control wheel, the exhaust valve maintains a range of 50% of the full rate of flow, provided by all other positions of the control wheel. Thus, for reasons of energy saving, a 100% rate of exhaust flow may be obtained for a limited time, say 1 hour as maximum only and the system returns automatically to the position of energy saving.

In operation, a group of forces biases the said valve disk 111 to the left:
Fa=total force of form and friction resistances, produced by the main flow
Fb=friction of the linear bearing (of the order 0.002-0.004)
Fmb=rolling friction of the elastic diaphragm 112, negligible
Fp=total of forces Fst, caused by the static pressure $p_1$ and the dynamic force Fd, caused by the main flow
sin $\phi$ (Fg)=leftward component of the weight of the moving parts, Fg
Fs=a force, produced by the return spring 117.
These forces are opposed by two forces:
Fm=cylinder force, produced by the control pressure $p_2$ and
Fv=vacuum force, produced by the ring-formed vacuum field in front of the main valve disk 111 and caused by the increase speed of air in the inlet opening.

Figure 12:
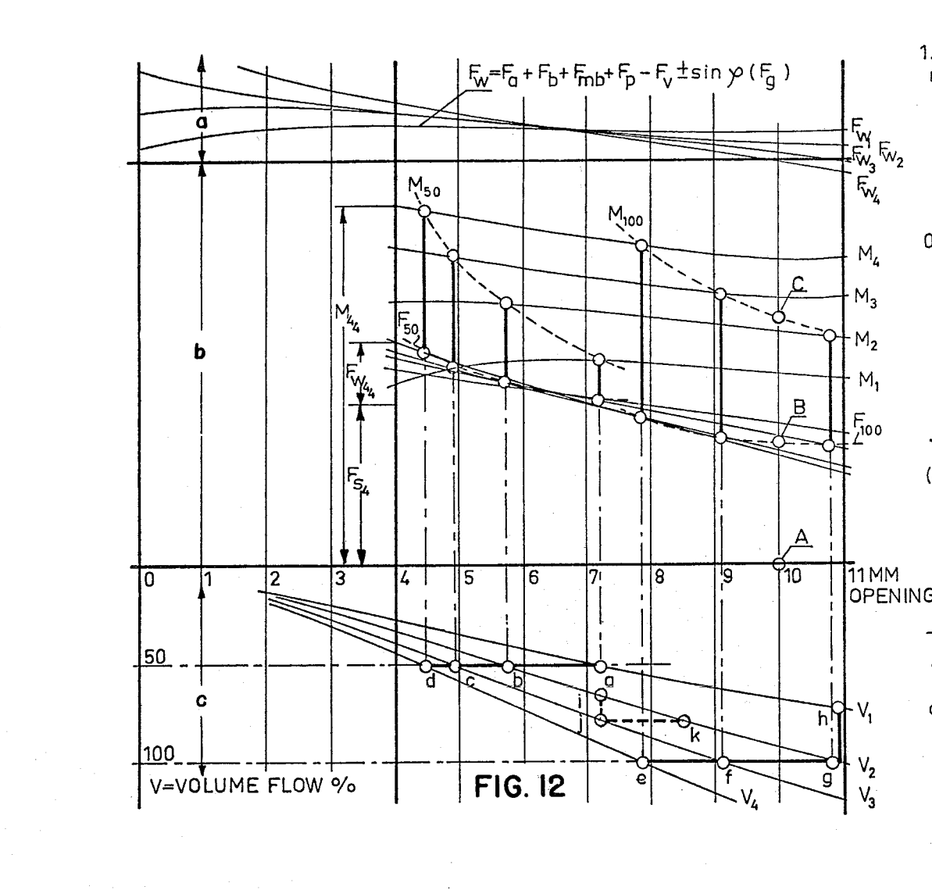
FIGS. 12 and 13 illustrate a theory for definition of the control cone characteristics of the embodiment illustrated in FIG. 9.
Figure 13:
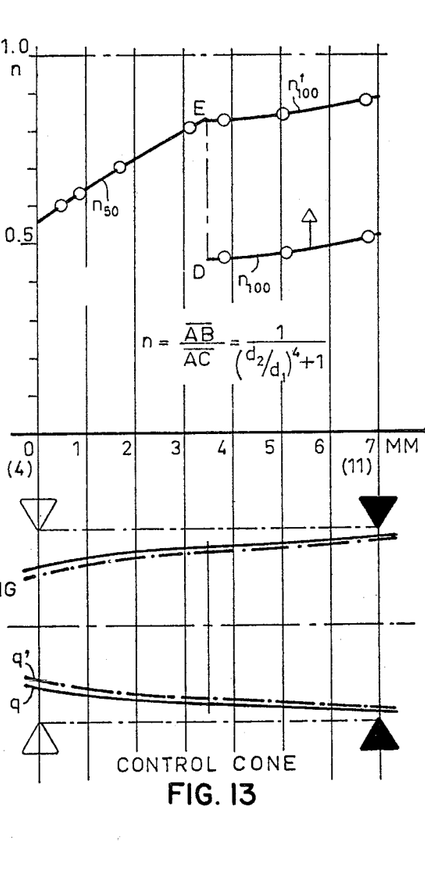

FIGS. 12 and 13 illustrate a theory for definition of the dimensions of the control cone 115, given the dimension $d_1'$ and the diameter of the opening of the control valve seat ring 110.

In FIG. 12 top portion a, a set of forces Fw are plotted against the axial displacement of the main valve disk 111, measured from the closed position. Each force Fw is a sum of all forces affecting to the left, excluding the spring force Fs and indexed according to corresponding pressures from 1 to 4 units per unit of area.

In FIG. 12 middle portion b the set of forces Fw are summed up with forces Fs, produced by the return spring 117 at each position of the main valve disk 111, and plotted against the position, together with maximum cylinder forces $M_1$-$M_4$, available at corresponding pressures 1-4 units per unit of area.

In FIG. 12 bottom portion c, a set of four curves $V_1$-$V_4$, representing the percent rates of volume flows at corresponding pressures 1-4 units per unit of area, are equally plotted against the position of the main valve disk 111.

In the same system of axis, the horizontal lines of 50% and 100% rate of main flow are drawn to intersect the curves $V_1$-$V_4$ at the points a, b, c, d and e, f, g, h respectively.

Vertical lines, passing these points, are drawn to intersect the curves in FIG. 12 portion b. Dotted lines $F_{50}$, $F_{100}$, $M_{50}$ and $M_{100}$ are drawn to pass the points of intersection obtained. Given the point of opening at 10 mm, designated as A, the ratio n=AB:AC.

In FIG. 13 top the values of n are plotted against the displacement in mm:s, measured from 4 mm:s from the point of closed valve. Two curves of n, $n_{50}$ and $n_{100}$, are obtained.

One could see, however, that there is a discontinuation in the course of these curves at the point of vertical line DE, causing a respective discontinuation in the control cone 115, represented in FIG. 13 bottom. Therefore, the flange of the control wheel 205 is used to reduce the opening $d_1'$ enough to shift the point D to the point E and to produce the cone geometry q in FIG. 13 bottom. The final geometry q' can be obtained by means of experimentally defined factors of correction as before.

The embodiment 100 of the present invention can be varied in numerous ways.

The embodiment 100 may be directly and variably adjustable, if the main valve seat 102 and the cover 103 are combined and capable of axial displacement. For this, the conduit 120 is removed and the opening $d_1'$ shifted, together with a filter if required, to the front end of the main valve disk 111. The displaceable cover 102, 103 is fitted with a spider in the opening and a spring guide for the spring 117, which is shifted to a new position between the main valve disk 111 and the spider.

In a duct installation, the main valve seat 102 may be fixably mounted within the duct and the embodiment can be either non-adjustable or remotely controllable.

The main valve disk 111 may also be separate from the cylinder system of the embodiment 100 and located outside the main valve seat 102. At the same time, the cylinder system will be inclined so that the spring force Fs in FIG. 11 can be replaced by a gravity force sin $\phi$ (Fg), opposite to the force Fp of its direction.

Apart from the external control, timer and filtration unit, illustrated by FIG. 10, various other means of control may be employed.

Figure 15:
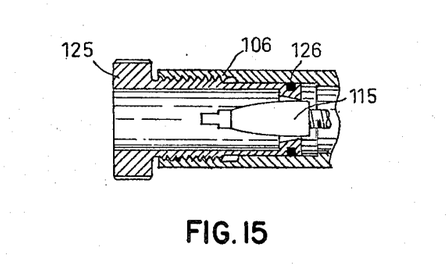
FIGS. 15 to 21 are cross-sectional view of embodiments of devices for external control of the embodiments illustrated by FIGS. 1 and 9.

In FIG. 15, the control valve housing 106 is fitted with threads inside. The control valve seat ring is extended axially to form a knob and fitted with a seal 126 and threads for axial displacement of the seat.

Figure 16:
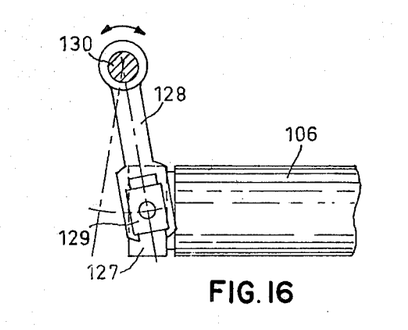

In FIG. 16, the means 127 is equal with the said means 125 except at the aft end, which is fitted with pins for axial displacement from outside by means of a shaft 130, a lever 128 and two slides 129.

Figure 17:
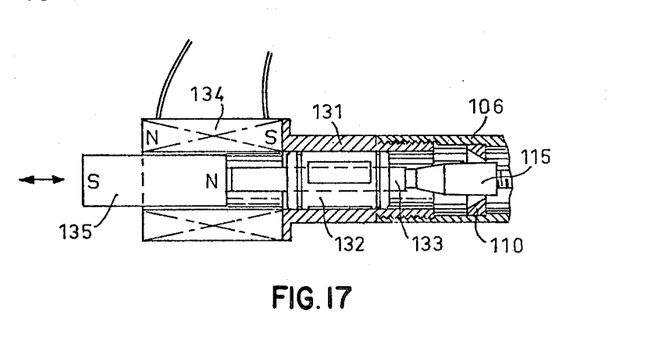

In FIG. 17, magnetic means of control are provided comprising a bearing housing 131, an additional linear bearing 132, an extension shaft 133, made of non-magnetic material and mounted in alignment with the shaft 113. A solenoid 134 is fixably secured to the bearing housing 131 to cause a proper displacement of a magnet 135, mounted on the extension shaft 133.

Figure 18:
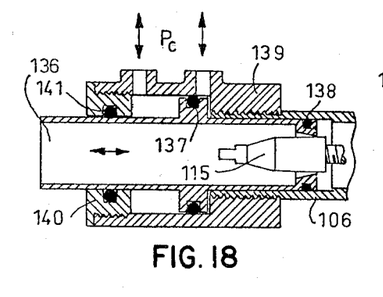

In FIG. 18 a means of 2-way hydraulic or pneumatic control are fixably mounted on the control valve housing 106. The means comprise a cylinder 139 with a sealably secured cover 140, fitted with a seal 141, and a hollow piston 136 having the control valve seat combined in its fore end. The piston is sealed with two O-rings 137 and 138. The axial displacement, needed for control, is caused with pressure Pc of the fluid on either side of the piston.

Figure 19:
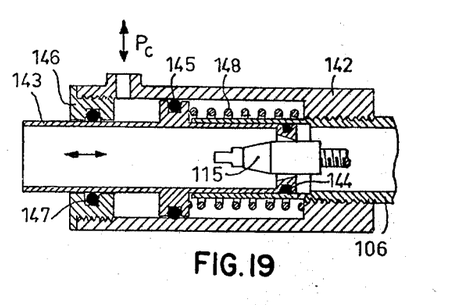

In FIG. 19, the means of control are provided for 1-way hydraulic or pneumatic control and comprise a cylinder 142, fixably mounted on the control valve housing 106, a sealable secured cover 146 with a seal 147, a hollow piston 143 with a control valve seat and two O-rings 144 and 145 as in FIG. 18 and a return spring 148, which may be made of ordinary spring materials or of bi-metal, if response to the temperature of the air is required. Variation of the control fluid pressure Pc produces the axial displacement of the control valve seat as needed.

Figure 20:
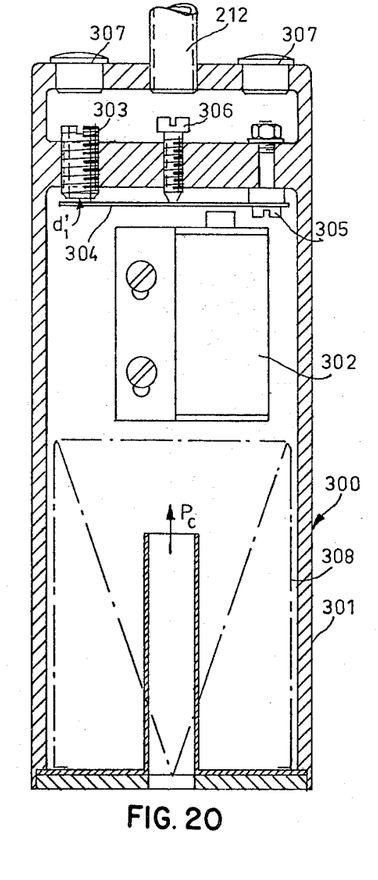

FIG. 20 is a cross-section of an embodiment of electromagnetic control and filter device, designated generally as 300 and comprising a housing 301, a filter 308, an electromagnet 302 and a cantilever spring 304, made of magnetic material and fixably secured with a screw 305. The free end of the spring 304 defines, together with an adjusting screw 306, the distance between the spring 304 and the nozzle 303 and, at the same time, the dimension of $d_1'$ in energy saving position of the exhaust valve controlled. Energizing the electromagnet 302, manually or remotely by means of radio signals, bends the spring 304 increasing the opening $d_1'$ to a dimension of 100% rate of volume flow. Two plugs 307 are provided for closure of the borings.

Figure 21:
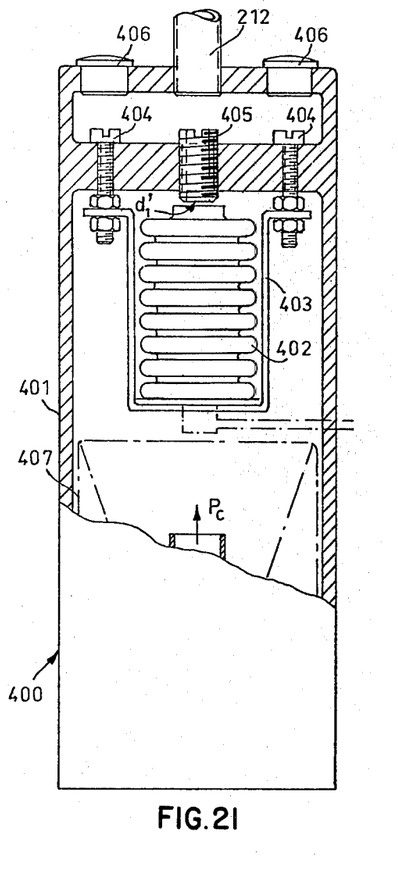

FIG. 21 is a cross-section of an embodiment of pneumatic or hydraulic control device, designated generally as 400 and comprising a housing 401, a filter 407, a bellows enclosure 402, fixably secured to the housing 401 with a support 403 and a pair of screws 404. The pressure inside the bellows enclosure defines the distance between the bellows enclosure and the nozzle 405, thus defining the dimension of $d_1'$ for control of the volume flow as described before.

Figure 22:
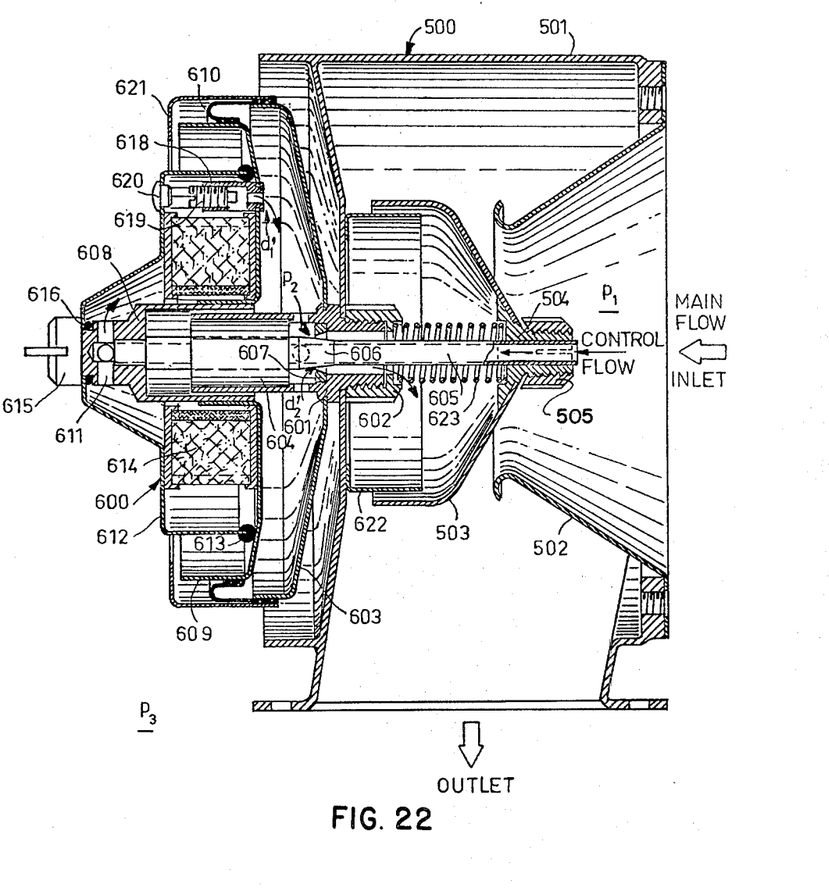
FIG. 22 is a cross-sectional view of an automatic constant pressure valve.

Finally, FIG. 22 is a cross-sectional view of one embodiment of the constant pressure valve, discussed above and designated generally as 500. This embodiment comprises a valve housing 501, a means of control of the main flow and an actuator, designated generally as 600.

A main valve seat 502 is provided to supply the fluid to the valve housing 501 being sealably mounted together with the housing itself. A control valve housing 601 is fixably engaged with a spring guide 602 to the aft end of the valve housing 501.

A cylinder bottom 603 is fixably engaged with said control valve housing 601, the aft end of which forms a housing for a linear bearing 604 of the type having endless roller tracks. A hollow shaft 605, partly extending to the valve housing 501, is capable of axial displacement inside and in alignment with said linear bearing 604 and the main valve seat 502, having a control cone 606 fixably mounted on it. The control cone and a control valve seat 607, fixably disposed in the said control valve housing 601, form the opening $d_2'$ of FIG. 3.

A means, comprising a boss 608 and a piston 609, are fixably mounted on the hollow shaft 605 to form, together with an elastic roller diaphragm 610 a hermetically closed actuator cylinder. The boss 608 has one or more borings 611 to form a conduit from the boring of the hollow shaft 605 to a means of filtration, comprising a filter housing 612, a housing seal 613, a filter 614 and a closed nut 615 for mounting of the means of filtration sealably, by means of an O-ring 616, to the aft end of the boss 608. A mantle 617 is provided for securing and protecting the roller diaphragm 610.

A nozzle 618 is fixably mounted to the cylinder bottom 603 providing an opening $d_1'$, (FIG. 3) fitted with an adjusting means 619, displaceably disposed in the housing of the nozzle. A plug 620 is provided for closing the opening in the filter housing 612, which opening is necessary for adjustement of the opening $d_1'$.

A fixably mounted mantle 621 is provided to secure and protect the roller diaphragm 610. A ring 622 is fixably mounted to the aft end of the main valve housing to protect a return spring 623, mounted on the hollow shaft 605.

Finally, a main valve disk 503 is adjustably mounted on the fore end of the hollow shaft 605 by means of a disk boss 504. The disk boss is fitted with two or more clefts and conical threads for purposes of tightening the joint by means of nut 505.

The method of pressure control need is illustrated in FIG. 12. The self-adjusting exhaust valve, FIG. 9, which is a constant flow valve of its type, responded to the rise of the pressure difference $p_1-p_3$ from 1 to 2 units per unit of area, corresponding a shift from point a to point i, through shift from said point i to point b along the curve $V_2$. This shift is illustrated by a heavy horizontal line a–b and means a displacement of the valve disk in the direction of closing the valve.

Contrary to this, the constant pressure valve responds to the rise of the pressure difference $p_1-p_3$ through opening the valve along the same curve of volume flow rate at constant pressure until the increase in the opening is capable of eliminating the disturbance and return to the original state of pressure difference. Thus, given the point i as original state of pressure and rate of volume flow, and a sudden rise of the pressure $p_1$ from 2 to 3 units per unit of area and, i.e., a shift from point i to point j with respective increase in the rate of volume flow, the valve will be opened from point j to point k, where it has reached the curve $V_2$ again.

Function of the valve is as follows:

A small part, about 1%, of the main flow is used for purposes of control and led, through the boring of the hollow shaft 605, to the filter space and, passing the opening $d_1'$, further to the cylinder space of the actuator 600. From there, passing the opening $d_2'$, the control flow enters to the outlet side of the main valve 500. The internal pressure $p_2$ of the actuator is controlled by the openings $d_1'$ and $d_2'$.

Therefore, given a rise in pressure $p_11$, the increase in pressure $p_2$ shifts the piston 609 left, increasing the opening $d_2'$ and opening the main valve respectively, until the control pressure $p_2$ has a proper valve for returning the balance between the increased spring force and the sum force of the piston 609 and the main valve disk 503.

A device according to the present invention, having in principle the construction of a constant flow valve as described before and being accurately calibrated to maintain desired rate of volume flow at varying pressures, can be fitted with magnetic means which are joined to any of the parts of the device capable of axial displacement. The magnetic means affects the frequency of an oscillating solenoid which is fixably joined to the housing of the device.

This kind of system can be constructed with the arrangement in FIG. 17 by replacing the magnet 135 with a piece of ferrite or material with corresponding magnetic characteristics and connecting the solenoid 134 to an oscillator.

The frequency of the oscillator is changed by the position of the piece of ferrite in the solenoid which ferrite piece is mounted on the shaft 133. So the displacement of the shaft (and e.g. the main valve disk 111 in FIG. 9) affects directly to the oscillator.

The signal received from the solenoid 134 is converted by appropriate known electronic components as frequency/voltage converters, analog/digital converters to a microprocessor and further to a digital display. The signal produces information about condition or capacities as rate of volume flow, temperature, pressure and accumalated quantity of thermal energy of fluid flow. The converted signal i.e. the data can be transmitted by means of wireless waves as a radio transmitter to central computer, control plant or the like.

I claim:

1. A device for maintaining constant rates of air flow in an air conditioning system, comprising:
   a valve housing, sealably disposed within the inlet end of an exhaust duct for the air flow and fitted with a combined main valve seat and cover;
   a cylinder enclosure, fixably mounted and supported within said housing in a space of lower pressure, said enclosure fitted with an inlet opening for control air, connected to a space of higher pressure upstream in the air flow, and an outlet opening connected to the space of lower pressure downstream in the air flow;
   a combined piston and main valve disc, capable of axial displacement in alignment with the axis of said enclosure and joined to it flexibly and hermetically;
   a shaft, capable of axial displacement and disposed in a linear bearing for purposes of supporting and aligning the movement of said combined piston and main valve disk; and
   means for control of the area of said outlet opening and for changing a resultant of forces opposing the force of said combined piston and main valve disk, said means including a fixably mounted control valve seat, a control valve cone, mounted on said shaft and having a predetermined geometrical form to comply with predetermined displacement/pressure difference ratio, and spring means for changing said resultant of said opposing forces.

2. A device as claimed in claim 1, wherein said valve housing is entirely disposed within a duct.

3. A device as claimed in claim 1, further including means for remote location and timed control of said inlet opening and filtration of the control fluid flow, the device comprising: a nozzle, mounted in a remote control housing; a conduit for connection of said nozzle to said inlet opening in said enclosure; means of control, including a closing device to form, together with said nozzle, said inlet opening, suitable to comply with predetermined displacement/pressure difference ratio; a timer for controlling the time of function of said closing device; and a filter for filtration of the control fluid, passing the valve.

4. A device as claimed in claim 1, wherein the control valve seat of said outlet opening is capable of axial displacement one of manually and by means of magnetic, hydraulic and pneumatic appliances.

5. A device as claimed in claim 1, including means for the control of said inlet opening comprising an electromagnet and a spring movable over said inlet opening by said electromagnet.

6. A device as claimed in claim 1, including means for the control of said inlet and outlet openings which are regulated remotely by radio signals.

7. A device as claimed in claim 1, including means for the control of said inlet opening comprising a bellows enclosure movable over said inlet opening.

8. A device as claimed in claim 1, including means for one of transmitting and displaying conditions, comprising: magnetic means, joined to at least one part of said device which is capable of axial displacement, said magnetic means affecting the frequency of an oscillating solenoid, fixably joined to the housing of said device; electronic components for converting and display of said conditions, including at least one of a frequency/voltage converter, an analog/digital converter, a microprocessor and a digital display.

9. A device for controlling a main flow in a conduit at a conduit pressure ($P_3$) using control air at a higher control pressure ($P_1$) comprising:
   a conduit valve member in the conduit which is movable to change the cross-sectional flow area of the conduit;
   a fixed cylinder with an axially movable piston sealed thereto and defining a chamber having at least two walls which are movable with respect to each other upon a change in chamber pressure ($P_2$) therein, said chamber pressure being intermediate said control and conduit pressures and pressure ($P_3$);
   said chamber means having a first opening communicating with said chamber of a first cross-sectional area ($D_1$) for receiving the control air as a small part of the main flow upstream of said conduit valve member, and a second opening communicating with said chamber of a second cross-sectional area ($D_2$) for discharging the control air to the main flow downstream of said conduit valve member;
   a second opening valve member connecting for movement with said piston and movable into said second opening for changing the cross-sectional flow area of said second valve opening;

a first opening valve member movably mounted with respect to said first opening to change the cross-sectional flow area thereof; and adjustment means connected to said first opening valve member to select the cross-sectional flow area of said first opening with said first and second opening cross-sectional areas being small with respect to a cross-sectional area of said conduit;

whereby the position of at least one of said conduit walls is changed to move the second opening valve member with change of chamber pressure.

10. A device according to claim 9, wherein said second opening valve member comprises a control cone, with a shaft connected between said cone and said piston axially movable in said cylinder, said conduit valve member comprising said piston, the conduit including a main flow valve seat with respect to which said piston is movable for regulating the main flow, said piston facing the main flow, and biasing means connected between said piston and said cylinder for biasing said piston against the main flow.

11. A device according to claim 9, wherein said adjustment means comprises timer means for changing the cross-sectional flow area of said first opening with time.

12. A method of controlling a fluid flow condition in a main fluid flow, comprising:

providing a control device having a fixed cylinder with a piston axially movable therewith and hermetically joined thereto to define a pressure chamber containing fluid at an intermediate pressure ($P_2$);

communicating the pressure chamber over an inlet opening with the main fluid flow upstream of the control device and at a higher pressure ($P_1$);

communicating the pressure chamber over an outlet opening with the main fluid flow downstream of the control device and at a lower pressure ($P_3$);

providing an outlet opening valve member in said outlet opening which is movable to regulate a cross-sectional area of said outlet opening, the outlet opening valve member fixedly connected to the piston for movement with the piston;

the piston positioned to receive a force from the main fluid flow to move the outlet opening valve member;

supplying a control flow from the main fluid flow at the higher pressure ($P_1$) to the inlet opening for regulating the intermediate pressure ($P_2$) in the pressure chamber; and regulating the cross-sectional area of the inlet opening to control the ratio between the cross-sectional area of the inlet and outlet openings, whereby energy from the pressure difference between the higher and lower pressures is utilized to move the piston and the outlet opening valve member.

* * * * *